United States Patent [19]

Zardi

[11] Patent Number: 4,946,657
[45] Date of Patent: Aug. 7, 1990

[54] SYSTEM TO REDUCE ENERGY CONSUMPTION IN HETEROGENEOUS SYNTHESIS REACTORS AND RELATED REACTORS

[75] Inventor: Umberto Zardi, Breganzona, Switzerland

[73] Assignee: Ammonia Casale SA, Switzerland

[21] Appl. No.: 110,925

[22] Filed: Oct. 20, 1987

[30] Foreign Application Priority Data

Oct. 22, 1986 [CH] Switzerland ............. 04202/86

[51] Int. Cl.$^5$ ............................................. B01J 8/02
[52] U.S. Cl. ................................. 422/148; 422/194; 422/202; 422/218; 422/239; 423/359; 423/361
[58] Field of Search ............. 422/148, 194, 202, 218, 422/239; 423/359, 361

[56] References Cited

U.S. PATENT DOCUMENTS

| | | | |
|---|---|---|---|
| 4,181,701 | 1/1980 | Topsoe et al. | 422/194 X |
| 4,372,920 | 2/1983 | Zardi | 422/148 |
| 4,405,562 | 9/1983 | Zardi et al. | 422/148 |
| 4,755,362 | 7/1988 | Zardi et al. | 422/148 |

FOREIGN PATENT DOCUMENTS

| | | | |
|---|---|---|---|
| 0007743 | 2/1980 | European Pat. Off. | |
| 2152405 | 8/1985 | United Kingdom | 422/148 |

Primary Examiner—Barry S. Richman
Assistant Examiner—Jill Johnston
Attorney, Agent, or Firm—Ostrolenk, Faber, Gerb & Soffen

[57] ABSTRACT

The system to reduce the energy consumption of heterogeneous synthesis reactors, particularly of ammonia reactors, f.i. the "Chemico"-type reactor, foresees the insertion of two cylindrical walls at least partially perforated in order to annularly delimit the catalytic beds; the first outer wall (Fe) having a diameter (Di) slightly smaller than diameter (Dc) of the cartridge (C), has a height (Hi) higher than (H'i) of the internal cylindrical wall (Fi) which has a diameter inferior to the above mentioned (Di), but superior to the external diameter (Dt) of the central feed pipe (T) of the quench gas (QG). The top (SO) of the internal cylindrical wall (Fi) is closed by a cover (CO) that has a distance from the bottom (FO) of the basket equal to the mentioned height (H'i) of the internal cylindrical wall. The catalytic bed is therefore annular in diameter (Di-D'i) on all of the said height (H'i), but is substantially cylindrical (of diameter Di) on the height (Hi-H'i).

In the substantially annular zone (Q) between the cylindrical internal perforated wall (Fi) and the external face of the pipe (T), which is also at least partially perforated, the reacted and quench gases are collected.

7 Claims, 2 Drawing Sheets

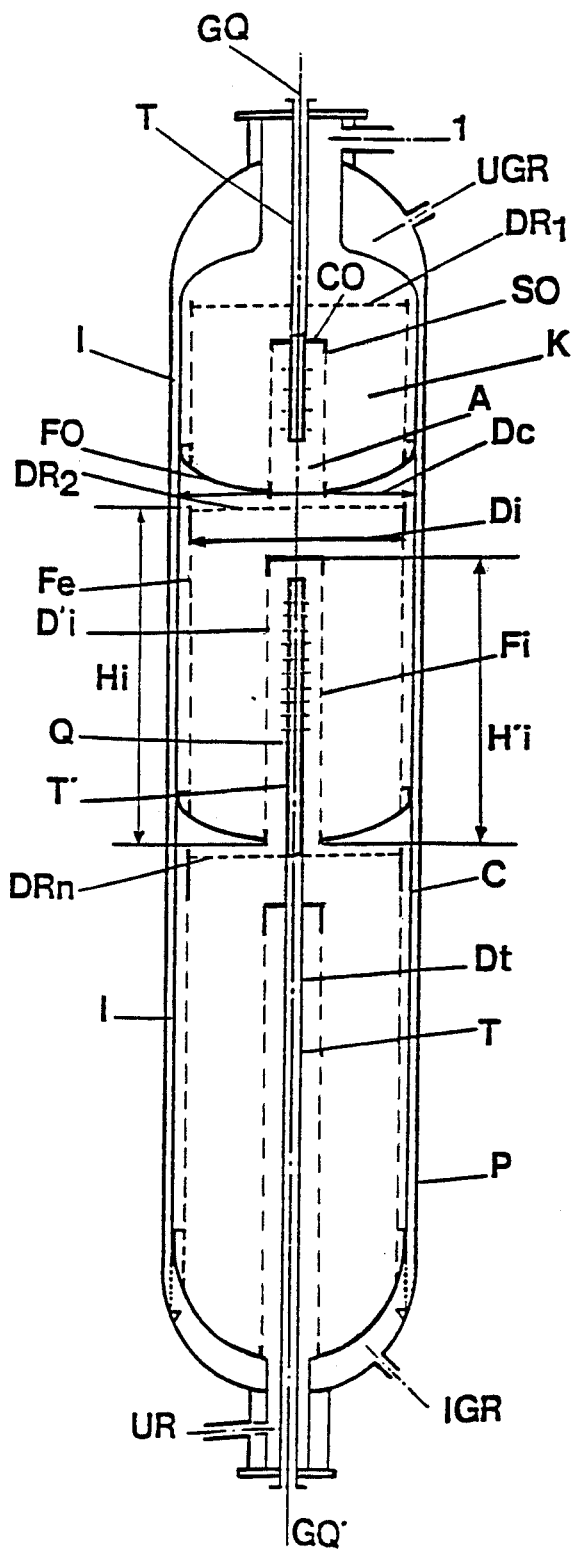
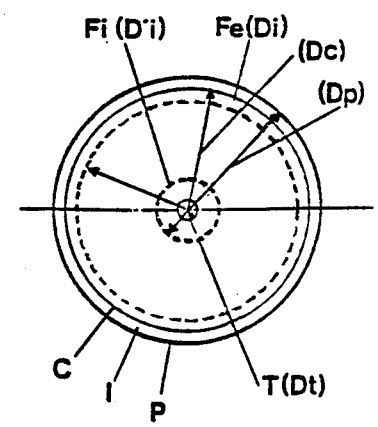
FIG.2
FIG.2A

SYSTEM TO REDUCE ENERGY CONSUMPTION IN HETEROGENEOUS SYNTHESIS REACTORS AND RELATED REACTORS

BACKGROUND OF THE INVENTION

1. Field of the invention

This invention refers to a system to increase the conversion yield and the reduce the energy consumptions in the reactors of heterogeneous synthesis reactors, in particular ammonia reactors, consisting of an external shell (P), usually in one piece, and of an internal cartridge (C) having a diameter (Dc) and containing granular catalyst arranged in one or more catalytic beds (K) that have an axial height (Hi) and that are closed between one external cylindrical wall made up of sections of said cartridge (C) having an internal diameter (Dc) and a height (Hi), an internal cylindrical wall made up of sections of an internal feed pipe for the quench gas (T) having a diameter (Dt) (small with respect to Dc) and a height (Hi), the upper transversal face of each bed being open and invested axially by synthesis gas.

As already known, the reactors for catalytic synthesis under pressure, particularly for the catalytic synthesis of ammonia, methanol, higher alcohols, etc., consist of an external shell, generally in one piece and an inner cartrdige shell containing a granular catalyst arranged in one or more layers (catalytic beds).

The synthesis gas that crosses the various catalytic beds is generally cooled between one bed and the other, with the aim of obtaining optimal temperature conditions in the various beds by means of the injection of fresh gas (quench reactor) or by means of a direct interchange with cold inlet gas.

2. Description of the Prior Art

Recently reactors have been proposed with gas radial flow in the catalytic beds (Lummus, Topsoe, Kellogg, U.S. Pat. Nos. 3,918,918 and 4,181,701, European Patent Application no. 007,743-A1) or with axial-radial flow (Ammonia Casale U.S. Pat. Nos. 4,372,920 and 4,405,562) that represent an important progress in comparision to reactors with axial flow, particularly when a large volume of catalyst must be exploited, permitting the reduction of the charge loss reduced across the catalytic beds, and therefore, of the energy consumptions. The axial flow of the gas in these cases means the adoption of reactors developed in width (low length-diameter ratio of the equipment) with high costs of the machinery and high energy consumption.

The ammonia Casale U.S. Pat. Nos. 4,372,920 and 4,405,562 have allowed a considerable simplification of the reactor's cartridge design favouring the obtainment of an internal reactor structure, with easy access for the maintenance and the loading and the substitution of the catalyst, and at the same time with low charge losses. According to the above patents, each catalytic bed is made up of a perforated external cylindrical wall, of a perforated internal cylindrical wall and of only one closed bottom (the upper wall of the basket is in fact completely open); an unperforated upper portion of the above internal cylindrical wall (or of both the cylindrical walls), in continuation with the open cross section between the upper edges of the two cylindrical walls arranged on a plane approximately perpendicular to the longitudinal axis of said perforated walls, forms a passage where a minor portion of the gas crosses the bed with a prevailingly axial flow, whereas the remaining major portion of the gas crosses with radial flow the major cross section of the catalytic bed arranged in the perforated zone of the two cylindrical bed walls.

According to the patented invention, the gas portion that crosses the bed with prevailingly axial flow is controled by the height of the portion of the unperforated internal (or internal or external) cylindrical wall, that is in all cases, a minor portion of the total height of the said wall. Reactors with dimensions corresponding to a height-diameter ratio higher than 10 (f.i. with diameter-height ratio lower than 0.1) are preferably realized according to the said patented invention.

In the present world-wide economic situation, the market for the modernization of existing plants is very important, the major part of which especially, in the case of synthesis processes (f.i. ammonia synthesis) use reactors with axial gas flow in the catalytic beds (axial reactors), characterized by a low height-diameter ratio of the equipment, due to the above mentioned necessity to reduce the charge loss within the machinery.

In preceding patent applications, particularly in the European patent application 86,104,911.2, the Applicants have already described a system to reduce energy consumptions of heterogeneous catalytic synthesis reactors under pressure, in particular of reactors with dimensions corresponding to low height-diameter ratios (lower than 10); in particular a system is described which is an ideal system to be utilized in the modernization of existing reactors with axial gas flow, in particular in Kellogg-type reactors which are used in numerous large-scale plants (800÷1500 MTD) mostly built towards the end of the 1970's. The main characteristics of the said plants, (besides the high capacity already cited), is the use of centrifugal machinery for the compression of gas operated with vapour produced in the plant itself, according to an integrated cycle between the process vapour and the vapour used to operate the machinery, and the use of the said axial Kellogg-type reactors.

The said plants are also characterized by the uncritically high energy consumptions of those years in which energy was available at a low cost, the axial-type reactor being the cause of said high consumptions.

In the continuation of their researches the Applicants have found a new system that is now also easily applied for the modernization of "Chemico"-type reactors.

SUMMARY OF THE INVENTION

The invention, concerns therefore a system specified in the introduction of the description and of the main claim, which is now characterized by the fact that in order to delimit each catalytic bed the following is inserted therein (see FIG. 2):

(a) inside and near said external wall which forms the cartridge (C), an external cylindrical wall (Fe) that is at least partially perforated on its height (Hi) and has a diameter (Di) slightly smaller than that of the cartridge (C);

(b) an internal cylindrical wall (Fi) showing, on at least one major portion (H'i) of the height (Hi) of the catalytic bed, a diameter (D'i) higher than that (Dt) of the internal transfer pipe (T) and perforations, and (c) a cover (CO) on the top of the internal wall (Fi) whereby the catalytic bed has an annular structure of diameter (Di-D'i) on the said height (H'i) and structure substantially cylindrical, more precisely of annular diameter (Di-Dt) on the minor height (Hi-H'i).

DETAILED DESCRIPTION OF THE PREFERRED EMBODMENTS

In one of the preferred embodiments of the invention, the flow of the synthesis gas that axially invests the said upper open face of each bed is so divided into a radial flow along the perforated height (H'i) of (Fi) and, eventually, into an axial flow along the height (Hi-H'i). The flow that crosses (axially and radially) the catalytic bed is collected in the annular zone between the said transfer pipe (T) of diameter (Dt) and the portion of the internal wall (Fi) having height (H'i) and diameter (Di). In this zone it is mixed with quench gas exiting from holes in the pipes (T, T').

The external face of the perforated wall (Fe) forms a conduct for the gas with the internal cartridge face (C). Since the height (Hi) varies in the various catalytic beds, the height (H'i) can be regulated in order to have the optimal ratios on each bed between the radial flow and the axial flow (the latter which can be negligible and even null).

The ratio between the portions of gas (with prevailingly axial flow and radial flow) will result differently in the various catalytic beds of the cartridge in the case that the same are of a variable height (ratio height-diameter of variable baskets), as in the application of this invention for the transformation of the above mentioned "Chemico" reactors, in which the height (Hi) of the catalytic beds of the internal cartridge increases in the various beds arranged in series (3 to 4 beds), and even in the case that the described hereafter should be applied which forsees the use of a diaphram that reduces the cross section arranged on the upper edges of the external cylindrical wall of the bed, lying directly upon the upper surface of the catalytic bed itself.

As said above according to another embodiment of the invention, the portion of gas that crosses the beds with axial flow in the upper beds of minor height can be reduced, at least equal to that of the following beds of major height, by means of a diaphram reducing the open cross section, contained between the upper edges of the external cylindrical wall of the beds, provided with suitable openings (holes, grooves or other) for the reduced passage of the gas, said diaphram lying directly on top of the upper surface of the catalytic bed itself, and showing according to a preferred embodiment, an opening, the total cross section of which increases radially from the inside to the outside of the bed (see European patent application no. 86,104,911.2).

According to another embodiment of the invention, especially in the case that the ratio between the height of the catalytic bed and the radial distance of the cylindrical walls of the same is much lower (lower than 3), the diaphram reducing the open cross section mentioned above can be a solid wall (without openings), always lying on the upper surface of the bed.

According to this modified embodiment the cylindrical walls may result perforated along their entire height (lacking the upper zone of the unperforated walls).

Other characteristics of the invention are specified in the claims from 2 to 6.

DESCRIPTION OF THE DRAWINGS

The different aspects and advantages of the invention better appear from the following description of the embodiment represented in FIG. 2, as compared to the Prior Art represented in FIG. 1, these two figures being schematic, longitudinal cross-sections.

In particular the following exemplifying description of a preferred embodiment (modification of the Chemico reactor with axial flow) should better illustrate the characteristics of the invention.

Figure 1:
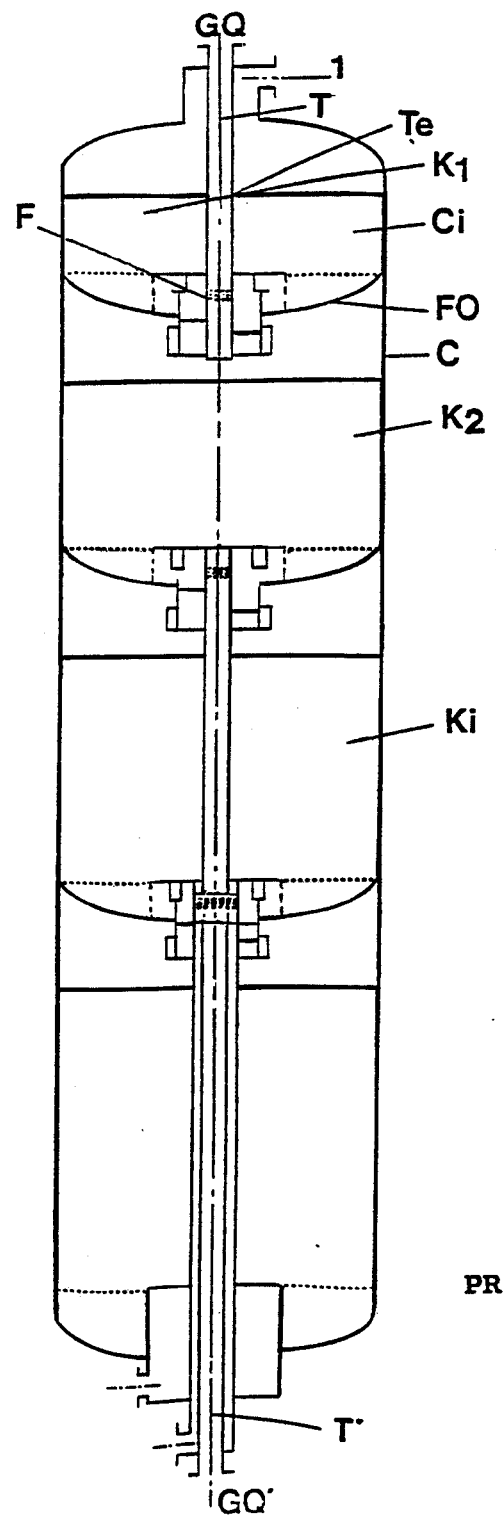

The embodiment described is referring to the modification of a Chemico ammonia reactor with several catalytic beds (f.i. four beds) crossed by gas with axial flow, and cooling of the gas in the various beds by means of an injection of fresh gas (quench reactor represented in FIG. 1 of the English patent no. 11,281,244 to which it is referred). The reaction gas enters from the top of the reactor in 1 and axially penetrates on a first catalytic bed (K1) open at the top and delimited by a portion of the internal wall (Ci) of the cartridge (C), by the corresponding portion of the internal face of the feed pipe (T) of the quench gas (GQ) and by a closed bottom (FO).

The reacted gases that have crossed the catalytic layer (K1) are mixed by various systems, with the quench gas (GA) exiting from the holes (F) in the pipe (T) and, cooled in this manner they pass through the next catalytic bed (K2). Even on the lower part of this bed, the reacted gases are mixed and the quench gases (GQ') fed by a pipe (T'). In FIG. 1 the shell is not represented.

In FIG. 2 the system according to the invention is represented, which forsees the insertion of an external cylindrical wall (Fe) at least partially perforated, having a height (Hi) and of diameter (Di) slightly lower than the internal diameter (Dc) of the cartridge (C); the insertion of a second internal wall (Fi) of a height (H'i < Hi) and of a diameter (D'i < Di), but higher than the external diameter (Dt) of the feed pipe (T) of the quench gas (GQ); and the application of a cover (CO) on the upper end of (Fi) that creates in this way a reversed cylinder closed at the top and open at the bottom (A). As can be seen, on each basket the catalyst assumes a prevailingly annular structure in diameter (Di - D'i) and in height (zone of radial flow ZR) and a minor structure substantially cylindrical in height (Hi - H'i) (zone of axial flow ZA). Actually the zone (ZA) is also annular in diameter (Di - Dt) and since (Dt) is small with respect to (Di), it can be considered practically cylindrical. The reaction gases enter from the top into 1, the reacted gases exit from the bottom into UR, IGR, and UGR indicate the entrance and exit of the cooling gas respectively of the internal wall of the shell (P) and of the external wall of the cartridge (C), f.i. of the airspace (I). T and T' indicate f.i. two feed pipes of the quench gas GQ and GQ', that can however be even more according to the number of catalytic baskets (K). Preferably, and in accordance with what described above in the preceding European patent application No. 86,104,911.2, the catalytic beds now have heights (Hi) differing one from the other, even (H'i) shall be variable, f.i. increasing from the top to the bottom, proportionally or not, to the incrementation of Hi. In other words, the ratio (Hi/H'i) can vary from one basket to another, which allows a better regulation of the values of axial flows (and therefore, radial flows) on the single beds. With respect to these and other aspects of the invention, it is worthwhile to refer to the above mentioned U.S. Pat. Nos. 4,372,920 and 4,405,562, and to the European patent application no. 86,104,911.2, the contents of which are considered incorporated herein.

In accordance to what is foreseen in the said European patent application on at least some of the upper surfaces of the catalytic beds (K), as the reducing (or annullatory) diaphrams (DR1 - DRn) of axial flow are placed. They are provided with adjustable openings (at the most, closable), preferably in sections varying from the inside to the outside. Even if the invention has been described with reference to the preferred embodiment represented in FIG. 2 and 2A, it is susceptible to variations, modifications, substitutions and the like, that is just because they are obvious to the technician skilled in this field, are to be considered automatically falling within the scope and the spirit of this invention.

I claim:

1. A system to increase the conversion yields and to reduce the energy consumption in heterogeneous synthesis reactors, consisting of an external shell (P) generally in one piece, and of a cartridge (C) having a diameter (Dc) and containing granular catalyst arranged in a plurality of catalytic beds (K) that have an axial height (Hi) and are closed between an external cylindrical wall made up of sections of said cartridge (C) having internal diameter (Dc) and height (Hi), an internal cylindrical wall made up of sections of internal feed pipe for fresh quench gas (T) having diameter (Dt) which is small with respect to the internal diameter (Dc) and a bottom, the top face of each bed being open and invested axially by synthesis gas, wherein there are provided:

(a) inside and near said external wall forming the cartridge (C), an external cylindrical wall (Fe) which is substantially perforated on its height (Hi) and has a diameter (Di) just slightly less than that (Dc) of the cartridge (C);

(b) an internal cylindrical wall (Fi) having, on at least one major portion (H'i) of the height (Hi) of the catalytic bed, a diameter (D'i) greater than that (Dt) of said internal feed pipe (T), and perforations; and (c) a perforated cover (CO) at the top of the internal wall of height (H'i) whereby the catalytic bed has an annular structure of diameter (Di-D'i) on said height (H'i) and a substantially cylindrical, annular structure with diameter (Di-Dt) on the minor height (Hi-H'i), and wherein the ratio (Hi/H'i) varies from one catalyst basket to another.

2. The system according to claim 1, wherein the gas flow path is axially and radially across the at least one catalytic bed and into the annular zone between the internal feed pipe (T) at diameter (Dt) and the portion of internal wall (Fi) having height (H'i<Hi) and diameter (D'i<Di).

3. The system according to claim 1, wherein cooling gas is circulated in the airspace between the internal wall of the shell and the external wall of the cartridge.

4. The system according to claim 1, wherein the ratio between the rate of axial flow of the gas to radial flow of the gas in the various catalytic beds of variable height is regulated in at least one of said beds by the height (Hi-H'i) of the portion of the unperforated feed pipe of the quench gas (T) in contact with the catalyst, and by a diaphram which reduces the quantity of gas that axially invests the upper open face of the catalytic bed.

5. The system according to claim 4, wherein said diaphram is provided with adjustable openings of variable sections and increasing radially from the inside to the outside of the bed, and directly placed on the upper surface of the catalytic bed, in such a way that the ratio between the two gas flow rates in the various beds varies from zero to 0.6.

6. The system according to claim 1, wherein the plurality of catalytic beds have different heights.

7. The system according to claim 6, wherein the plurality of catalytic beds are arranged so that the height of each bed increases from the highest basket to the lowest.

* * * * *